United States Patent
Kwon et al.

(10) Patent No.: US 11,419,076 B2
(45) Date of Patent: Aug. 16, 2022

(54) METHOD FOR DETECTING SYNCHRONIZATION SIGNAL, RECEIVER AND REPEATER USING THE SAME

(71) Applicants: SOLiD, INC., Seongnam-si (KR); FOUNDATION OF SOONGSIL UNIVERSITY-INDUSTRY COOPERATION, Seoul (KR)

(72) Inventors: Nagwon Kwon, Gyeonggi-do (KR); Hyunchae Kim, Seoul (KR); Chonghoon Kim, Seoul (KR)

(73) Assignees: SOLiD, INC., Seongnam-si (KR); FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 0 days.

(21) Appl. No.: 16/991,586

(22) Filed: Aug. 12, 2020

(65) Prior Publication Data

US 2021/0058878 A1  Feb. 25, 2021

(30) Foreign Application Priority Data

Aug. 13, 2019 (KR) .................. 10-2019-0099117
Aug. 7, 2020 (KR) .................. 10-2020-0099502

(51) Int. Cl.
*H04W 56/00* (2009.01)
*H04W 72/04* (2009.01)
*H04W 74/08* (2009.01)
*H04L 5/14* (2006.01)
*H04L 27/26* (2006.01)

(52) U.S. Cl.
CPC ......... *H04W 56/001* (2013.01); *H04L 5/1469* (2013.01); *H04L 27/2636* (2013.01); *H04W 56/005* (2013.01); *H04W 72/0453* (2013.01)

(58) Field of Classification Search
None
See application file for complete search history.

(56) References Cited

U.S. PATENT DOCUMENTS

2016/0262118 A1* 9/2016 Kim .................... H04W 52/365
2018/0278455 A1* 9/2018 Reial .................... H04L 27/2663

* cited by examiner

*Primary Examiner* — Sai Aung
(74) *Attorney, Agent, or Firm* — Sughrue Mion, PLLC

(57) ABSTRACT

Provided are a synchronization signal detection method performed by a receiver including a processor and a memory, the synchronization signal detection method comprises calculating a PSS correlation value for a primary synchronization signal (PSS) included in a received signal, detecting a frequency offset for the PSS and a timing offset for sampling timing of the received signal and detecting the PSS based on the PSS correlation value, the frequency offset, and the timing offset.

14 Claims, 4 Drawing Sheets

METHOD FOR DETECTING SYNCHRONIZATION SIGNAL, RECEIVER AND REPEATER USING THE SAME

CROSS-REFERENCE TO RELATED APPLICATIONS

This application claims the benefits of Korean Patent Applications No. 10-2019-0099117, filed on Aug. 13, 2019 and No. 10-2020-0099502, filed on Aug. 7, 2020, in the Korean Intellectual Property Office, the disclosures of which are incorporated herein in their entireties by reference.

BACKGROUND

1. Field

The disclosure relates to a synchronization signal detection method and a receiver and a repeater using the same, and more particularly, to a synchronization signal detection method capable of detecting a primary synchronization signal (PSS) based on a PSS correlation value, a frequency offset, and a timing offset, and a receiver and a repeater using the same.

The disclosure is based on the results of WC300 R&D "Total Coverage Solution development project through securing future core technologies of ICS and DAS (Task number S2521647)".

2. Description of the Related Art

In a time division duplex (TDD) type 5G-New Radio (NR) communication standard in which downlink and uplink allocation is free within a frame, cyclic prefix (CP)-based symbol boundary detection is preceded, and because it is difficult to apply a method of performing primary synchronization signal (PSS) detection in a frequency domain afterwards, PSS detection in a time domain needs to precede the start of cell search.

In addition, a PSS in a long term evolution (LTE) communication standard is always located at the center of a band, but a PSS in the 5G-NR communication standard changes its position in a band according to a standalone (SA) standard and a non-standalone (NSA) standard, so faster and more extensive PSS detection in a band is required.

SUMMARY

Provided are a synchronization signal detection method capable of detecting a primary synchronization signal (PSS) based on a PSS correlation value, a frequency offset, and a timing offset, and a receiver and a repeater using the same.

According to an aspect of an embodiment, a synchronization signal detection method performed by a receiver including a processor and a memory, the synchronization signal detection method comprises calculating a PSS correlation value for a primary synchronization signal (PSS) included in a received signal, detecting a frequency offset for the PSS and a timing offset for sampling timing of the received signal and detecting the PSS based on the PSS correlation value, the frequency offset, and the timing offset.

According to an aspect of an embodiment, the calculating of the PSS correlation value may comprise calculating the PSS correlation value according to a correlation between a PSS vector stored in the memory and the received signal.

According to an aspect of an embodiment, the PSS vector may be a PSS vector in a time domain that reflects a conjugate transpose matrix of a discrete fourier transform (DFT) matrix to a PSS vector in a frequency domain.

According to an aspect of an embodiment, the synchronization signal detection method may further comprise shifting a frequency band of the received signal by the frequency offset before calculating the frequency offset and the timing offset.

According to an aspect of an embodiment, the frequency offset may have a value corresponding to a difference between a center frequency of the received signal and a frequency at which the PSS is located.

According to an aspect of an embodiment, the calculating of the frequency offset and the timing offset may comprise calculating the frequency offset using a frequency offset detection vector including a fine shift matrix indicating a frequency shift in a time domain and the PSS vector.

According to an aspect of an embodiment, the synchronization signal detection method may further comprise performing decimation on an adjacent band including the frequency at which the PSS is located in the received signal before the calculating of the frequency offset and the timing offset.

According to an aspect of an embodiment, the synchronization signal detection method may further comprise resampling the decimated received signal.

According to an aspect of an embodiment, the timing offset may correspond to a timing error occurring in the resampling process.

According to an aspect of an embodiment, the calculating of the frequency offset and the timing offset may comprise calculating the timing offset using a timing offset detection vector including a fine shift matrix indicating timing delay in a time domain and the PSS vector.

According to an aspect of an embodiment, the synchronization signal detection method may further comprise feeding back the detected frequency offset.

According to an aspect of an embodiment, the synchronization signal detection method may further comprise feeding back the detected timing offset.

According to an aspect of an embodiment, the synchronization signal detection method may further comprise detecting the PSS from the received signal received in a time division duplex (TDD) communication system.

According to an aspect of another embodiment, a receiver including a processor and a memory, the receiver may comprises a PSS correlator configured to calculate a PSS correlation value for a primary synchronization signal (PSS) included in a received signal, a frequency offset detector configured to detect a frequency offset for the PSS, a timing offset detector configured to detect a timing offset for sampling timing of the received signal and a sync detector configured to detect the PSS based on the PSS correlation value, the frequency offset, and the timing offset.

According to an aspect of another embodiment, a repeater including a receiver receiving and processing a communication signal, wherein the receiver may comprise a PSS correlator configured to calculate a PSS correlation value for a primary synchronization signal (PSS) included in a received signal, a frequency offset detector configured to detect a frequency offset for the PSS, a timing offset detector configured to detect a timing offset for sampling timing of the received signal and a sync detector configured to detect the PSS based on the PSS correlation value, the frequency offset, and the timing offset.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
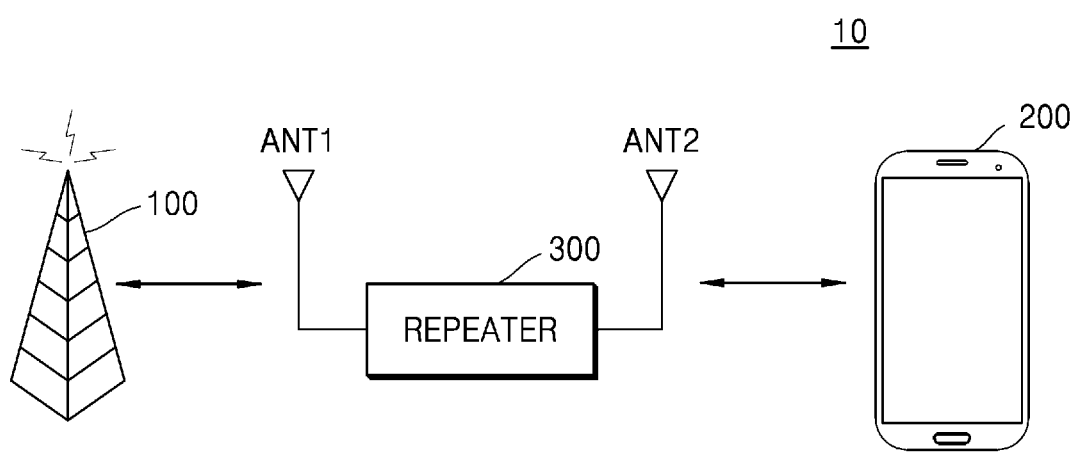
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system 10 according to an embodiment.

Referring to FIG. 1, the communication system 10 according to an embodiment may include a base station 100, a wireless communication terminal 200, and a repeater 300.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network (non-standalone (NSA) or standalone (SA)), or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

According to an embodiment, the communication signal may be a communication signal according to a 5G-new radio (5G-NR) standard, but is not limited thereto.

The first antenna ANT1 may be referred to as a donor antenna and the second antenna ANT2 may be referred to as a service antenna or a coverage antenna, but are not limited thereto.

According to an embodiment, the repeater 300 may be implemented as a repeater for relaying a wireless communication signal such as an RF repeater or an interference cancellation system (ICS) repeater.

According to another embodiment, the repeater 300 may be implemented as a distributed antenna system that receives a communication signal from the base station 100 through a wired network and transmits a wireless communication signal to the wireless communication terminal 200.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

The wireless communication terminal 200 may mean a device capable of performing wireless communication according to various mobile communication standards, and its shape may be variously modified.

The wireless communication terminal 200 and the repeater 300 may include a device (e.g., a receiver) for receiving a wireless communication signal (e.g., a radio frequency (RF) signal) and detecting a synchronization signal (e.g., a primary synchronization signal (PSS)) included in the received wireless communication signal. The detailed structure and operation of the receiver will be described later with reference to FIGS. 2 to 4.

Figure 2:
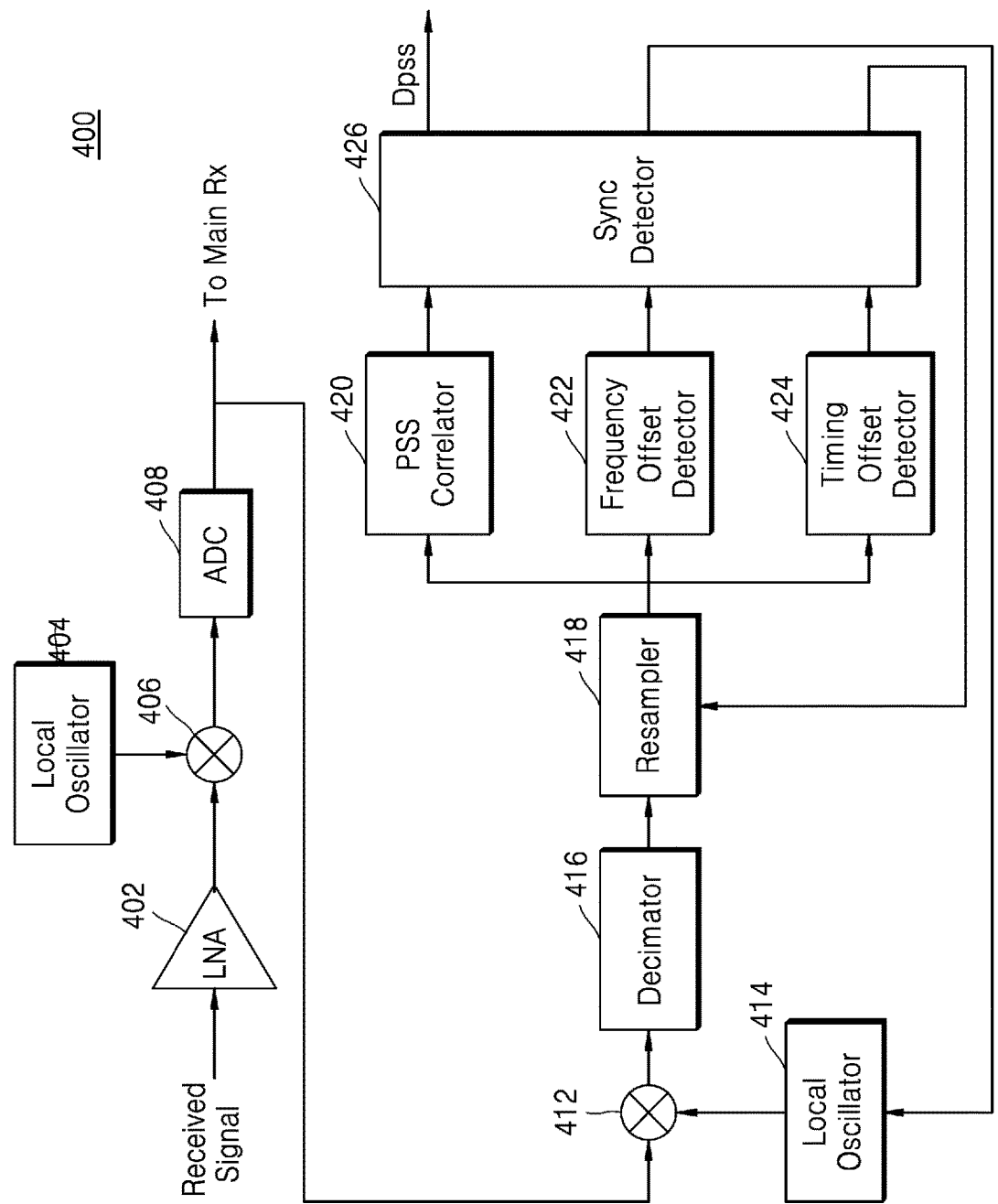
FIG. 2 is a block diagram of a receiver according to an embodiment.

FIG. 2 is a block diagram of a receiver 400 according to an embodiment.

Referring to FIG. 2, the receiver 400 according to an embodiment may include a low noise amplifier (LNA) 402, a first mixer 406, a first local oscillator 404, an analog-to-digital converter (ADC) 408, a second mixer 412, a second local oscillator 414, a decimator 416, a resampler 418, a PSS correlator 420, a frequency offset detector 422, a timing offset detector 424, and a sync detector 426.

The low noise amplifier 402 may receive a received signal, amplify the received signal, and output the amplified signal.

The low noise amplifier 402 may have a characteristic of a low noise figure (NF).

The first local oscillator 404 may generate a signal for converting a frequency band of a received signal and provide the generated signal to the first mixer 406. The first mixer 406 may convert a frequency band of a received signal by mixing the signal provided from the first local oscillator 404 with the received signal.

According to an embodiment, the first mixer 406 may down-convert a frequency band of a received signal in a radio frequency (RF) band to a baseband.

The ADC 408 may perform analog-to-digital conversion of the frequency-converted received signal through the mixer 406 and output as a digitally-converted signal.

The digital signal output from the ADC 408 may be transmitted to a main receiver (main Rx) (not shown) of a communication device including the receiver 400.

The digital signal output from the ADC 408 may also be transmitted to the second mixer 412 to detect a synchronization signal.

The second mixer 412 may convert the frequency band by mixing a signal output by the second local oscillator 414 with a digitally-converted received signal.

According to an embodiment, the second mixer 412 may shift a frequency band of a received signal received from the ADC 408.

According to an embodiment, the second mixer 412 may shift the frequency band of the received signal by a preset frequency offset. For example, the second mixer 412 may shift the frequency band of the received signal such that a PSS included in the received signal is located in the middle of a frequency band extracted by the decimator 416.

According to an embodiment, the frequency offset may be set to correspond to a difference between a center frequency of the received signal and a frequency at which the PSS is located.

According to an embodiment, the frequency offset may be reset according to feedback of the sync detector 426.

The decimator 416 may perform decimation on an adjacent band including the frequency at which the PSS is located in the received signal output by being frequency shifted by the second mixer 412. The decimator 416 may extract and output a signal of the adjacent band including the frequency at which the PSS is located in the received signal.

The resampler 418 may resample a received signal decimated by the decimator 416.

According to an embodiment, the resampler 418 may resample a received signal at a sampling rate corresponding to a sample of a received signal to be used by the PSS correlator 420, the frequency offset detector 422, and the timing offset detector 424 at a rear end of the resampler 418.

According to an embodiment, the resampler 418 may resample a received signal according to a sampling rate and sampling timing that are preset.

According to an embodiment, the sampling timing of the resampler 418 may be reset according to feedback of the sync detector 426.

The received signal resampled and output by the resampler 418 may be transmitted to the PSS correlator 420, the frequency offset detector 422, and the timing offset detector 424, respectively.

The PSS correlator 420 may calculate a PSS correlation value for a PSS included in the received signal.

According to an embodiment, the PSS correlator 420 may calculate the PSS correlation value according to a correlation between a PSS vector stored in a memory (not shown) and the received signal.

According to an embodiment, a PSS vector in a frequency domain may be defined according to Equations 1 to 3 below, and a PSS vector in a time domain may be defined as Equation 4 below.

$$\tilde{h} = [\tilde{h}_0 \ \tilde{h}_1 \ \ldots \ \tilde{h}_{126}]^T \quad \text{(Equation 1)}$$

$$\tilde{h}_n = \begin{cases} d_{pss}(n+63)/\sqrt{127} & (0 \le n \le 63) \\ d_{pss}(n-64)/\sqrt{127} & (64 \le n \le 126) \end{cases}$$

(In Equation 1 above, $\tilde{h}$ is the PSS vector in the frequency domain, $d_{pss}(n)$ is an NR-PSS sequence)

$$d_{pss}(n) = 1 - 2x(m),$$

$$m = (n + 43 N_{ID}^{(2)}) \bmod 127, \quad \text{(Equation 2)}$$

(In Equation 2 above, $N_{ID}^{(2)}$ is a sector index, and $x(n)$ is an m-sequence defined as Equation 3 below)

$$x(i+7) = (x(i+4) + x(i)) \bmod 2 \quad \text{(Equation 3)}$$
$$[x(6) \ x(5) \ \ldots \ x(0)] = [1 \ 1 \ 1 \ 0 \ 1 \ 1 \ 0]$$

$$h = \tilde{F}^H \tilde{h}, \ (F)_{kn} = \frac{1}{\sqrt{N}} e^{j\frac{2\pi}{N}(k-1)(n-1)} \quad \text{(Equation 4)}$$

(In Equation 4 above, h is the PSS vector in the time domain, and matrix F is a discrete fourier transform (DFT) matrix)

According to an embodiment, the PSS correlator 420 may use the PSS vector in the time domain, and the PSS vector in the time domain may be the PSS vector in the time domain in which a conjugate transpose matrix of the DFT matrix is reflected in the PSS vector in the frequency domain as shown in Equation 4.

The frequency offset detector 422 may detect an actual frequency offset of the received signal, and may feed back the detected actual frequency offset to the second local oscillator 414 through the sync detector 426.

The frequency offset detector 422 may detect a frequency offset using a frequency offset detection vector.

According to an embodiment, the frequency offset detection vector may be defined by the following Equation 5 and Equation 6.

A fine shift matrix constituting the frequency offset detection vector may be defined as a diagonal matrix by the following Equation 5.

$$(S_\delta) = \delta_{pq} e^{j\frac{2\pi\delta}{N}\left((p-1) - \frac{N-1}{2}\right)} \quad \text{(Equation 5)}$$

(In Equation 5 above, δ value is a real value between −1 and 1)

In this case; $S_\delta h$ may denote that a frequency of vector h is shifted by δ.

A frequency offset detection vector including a fine shift matrix indicating a frequency shift in a time domain and a PSS vector may be defined by Equation 6 below.

$$d_v = (S_1 - S_{-1})h \quad \text{(Equation 6)}$$

(In Equation 6 above, $d_v$ is a frequency offset detection vector)

The frequency offset detector 422 may detect a frequency offset according to a frequency offset detection function defined by Equations 7 to 9 below by using a frequency offset detection vector defined by Equations 5 and 6.

$$D_v(\tau, v) = \frac{\langle d_v^H x \rangle e^{-j\phi}}{\sqrt{\langle x_n^H x_n \rangle}} \quad \text{(Equation 7)}$$

$$D_v(\tau, v) = \Lambda(v) \frac{\Lambda(\tau - 1) - \Lambda(\tau + 1)}{\sqrt{1 + SNR^{-1}}} \quad \text{(Equation 8)}$$

$$\phi = \arg(C_n(\tau, v)) \quad \text{(Equation 9)}$$

(In Equations 7 to 9 above, $D_v$ is a frequency offset detection function, and σ is a phase)

According to an embodiment, the frequency offset detector 422 may output a result value of the frequency offset detection function according to Equation 8.

The timing offset detector 424 may detect a timing offset using a timing offset detection vector.

According to an embodiment, the timing offset may mean a value corresponding to a timing error occurring in a resampling process of the resampler 418.

According to an embodiment, the timing offset detection vector may be defined by the following Equations 10 and 11.

A fine shift matrix constituting the frequency offset detection vector may be defined by the following Equation 10.

$$T_\delta = F^H S_{-\delta} F \quad \text{(Equation 10)}$$

(In Equation 10 above, $T_\delta$ denotes delay in a time domain, and $T_\delta$ and $S_\delta$ are unitary matrices ($S_v^H = S_v^{-1} = S_{-v}$, $T_\tau^H = T_\tau^{-1} = T_{-\tau}$))

A timing offset detection vector including a fine shift matrix indicating timing delay in a time domain and a PSS vector may be defined by the following Equation 11.

$$d_\tau = (T_1 - T_{-1})h \quad \text{(Equation 11)}$$

(In Equation 11 above, $d_T$ is a timing offset detection vector)

The timing offset detector 424 may detect a frequency offset according to a frequency offset detection function defined by Equations 12 and 13 below and Equation 9 by using a frequency offset detection vector defined by Equations 10 and 11.

$$D_\tau(\tau, v) = \frac{\langle d_\tau^H x \rangle e^{-j\phi}}{\sqrt{\langle x_n^H x_n \rangle}} \quad \text{(Equation 12)}$$

$$D_\tau(\tau, v) = \Lambda(\tau) \frac{\Lambda(v - 1) - \Lambda(v + 1)}{\sqrt{1 + SNR^{-1}}} \quad \text{(Equation 13)}$$

(In Equations 12 and 13 above, $D_T$ is a frequency offset detection function, and ø is a phase)

According to an embodiment, the timing offset detector 424 may output a result value of the timing offset detection function according to Equation 13.

The sync detector 426 may detect a PSS based on a PSS correlation value output from the PSS correlator 420, a frequency offset output from the frequency offset detector 422, and a timing offset output from the timing offset detector 424.

The sync detector 426 may detect a PSS at a point where a value of a PSS detection function becomes the maximum according to Equation 14 below.

$$\text{Det}(\tau, v) = (|C_n|^2 + \alpha(|D_\tau|^2 + |D_v|^2))^{1/2} \quad \text{(Equation 14)}$$

(The α is a preset constant between 0 and 1)

According to an embodiment, the constant α applied to a timing offset and a frequency offset in Equation 14 above may be changed to increase a detection frequency adaptively according to a detection frequency of a synchronization signal. For example, the sync detector 426 may monitor the detection frequency of the synchronization signal while increasing or decreasing the constant α by a certain amount, and may set the constant α as constant at which the detection frequency of the synchronization signal is maximum.

The sync detector 426 may output information $D_{pss}$ about a detected synchronization signal (PSS). The information $D_{pss}$ about the synchronization signal PSS output from the sync detector 426 may be utilized in the operation of a communication system including the receiver 400.

The sync detector 426 may feed back a frequency offset output by the frequency offset detector 422 to the second local oscillator 414. The second local oscillator 414 may generate a signal for shifting a frequency band of an input signal according to the fed back frequency offset.

The sync detector 426 may feed back a timing offset output by the timing offset detector 424 to the resampler 418. The resampler 418 may adjust timing that is a reference for resampling according to the fed back timing offset.

According to an embodiment, the sync detector 426 may perform feedback after performing a certain process (e.g., normalization) on the frequency offset or the timing offset.

According to an embodiment, each of the second mixer 412, the second local oscillator 414, the decimator 416, the resampler 418, the PSS correlator 420, the frequency offset detector 422, the timing offset detector 424, and the sync detector 426 may be implemented as a digital logic circuit, and some configurations may be implemented as some functions of a digital signal processor.

According to an embodiment, a signal processed by each of the second mixer 412, the second local oscillator 414, the decimator 416, the resampler 418, the PSS correlator 420, the frequency offset detector 422, the timing offset detector 424, and the sync detector 426 is a digital signal, and the digital signal may be a complex baseband digital signal.

Figure 3:
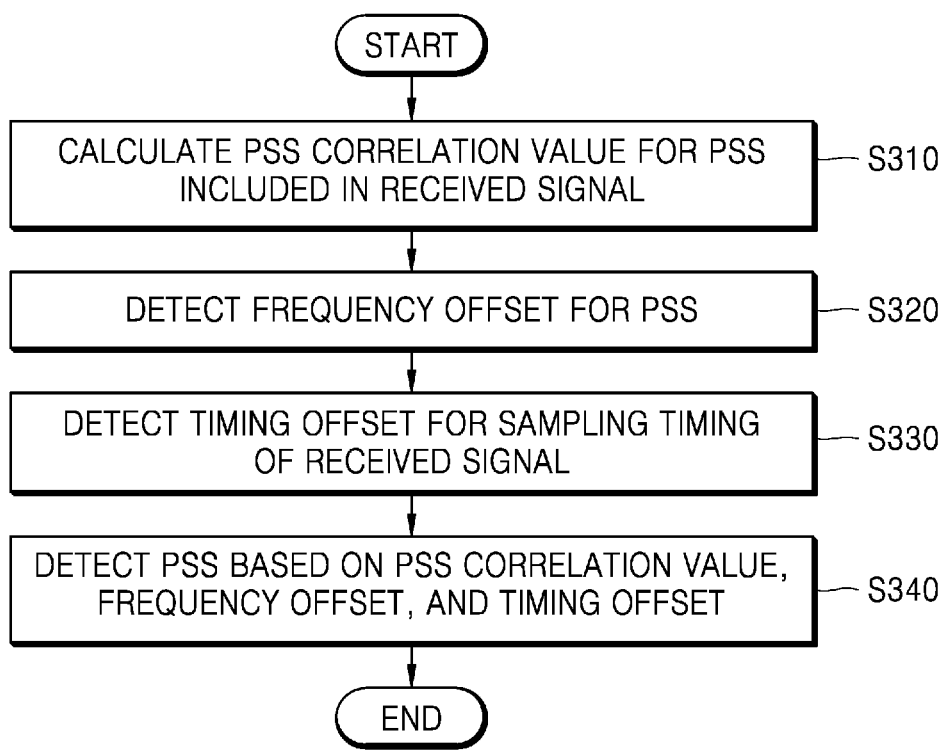
FIG. 3 is a flowchart of a synchronization signal detection method according to an embodiment.

FIG. 3 is a flowchart of a synchronization signal detection method according to an embodiment.

Referring to FIGS. 1 to 3, in operation S310, the receiver 400 may calculate a PSS correlation value for a PSS included in a received signal.

According to an embodiment, the receiver 400 may calculate a PSS correlation value according to a correlation between a PSS vector and the received signal.

In operation S320, the receiver 400 may detect a frequency offset for the PSS.

According to an embodiment, the receiver 400 may detect a frequency offset by using a frequency offset detection vector including the PSS vector and a fine shift matrix indicating a frequency shift in a time domain.

In operation S330, the receiver 400 may detect a timing offset for sampling timing of the received signal.

According to an embodiment, the receiver 400 may detect a timing offset by using a timing offset detection vector including the PSS vector and a fine shift matrix indicating timing delay in a time domain.

In operation S340, the receiver 400 may detect the PSS based on the PSS correlation value, the frequency offset, and the timing offset calculated or detected in operations S310 to S330.

According to an embodiment, the receiver 400 may transmit the information $D_{pss}$ about a detected synchronization signal (PSS) to another unit in a communication system so as to be used for an operation of the communication system including the receiver 400.

According to an embodiment, the detected frequency offset may be fed back and used in a frequency conversion process of the received signal. Accordingly, the second local oscillator 414 may generate a signal by tracking the frequency offset such that the second mixer 412 may perform an optimal frequency shift corresponding to the changing frequency offset.

According to an embodiment, the detected timing offset may be fed back and used in a resampling process of the received signal. Accordingly, the resampler 418 may resample the received signal decimated by the decimator 416 by tracking the timing offset such that optimal resampling timing may be adjusted corresponding to the changing timing offset.

Figure 4:
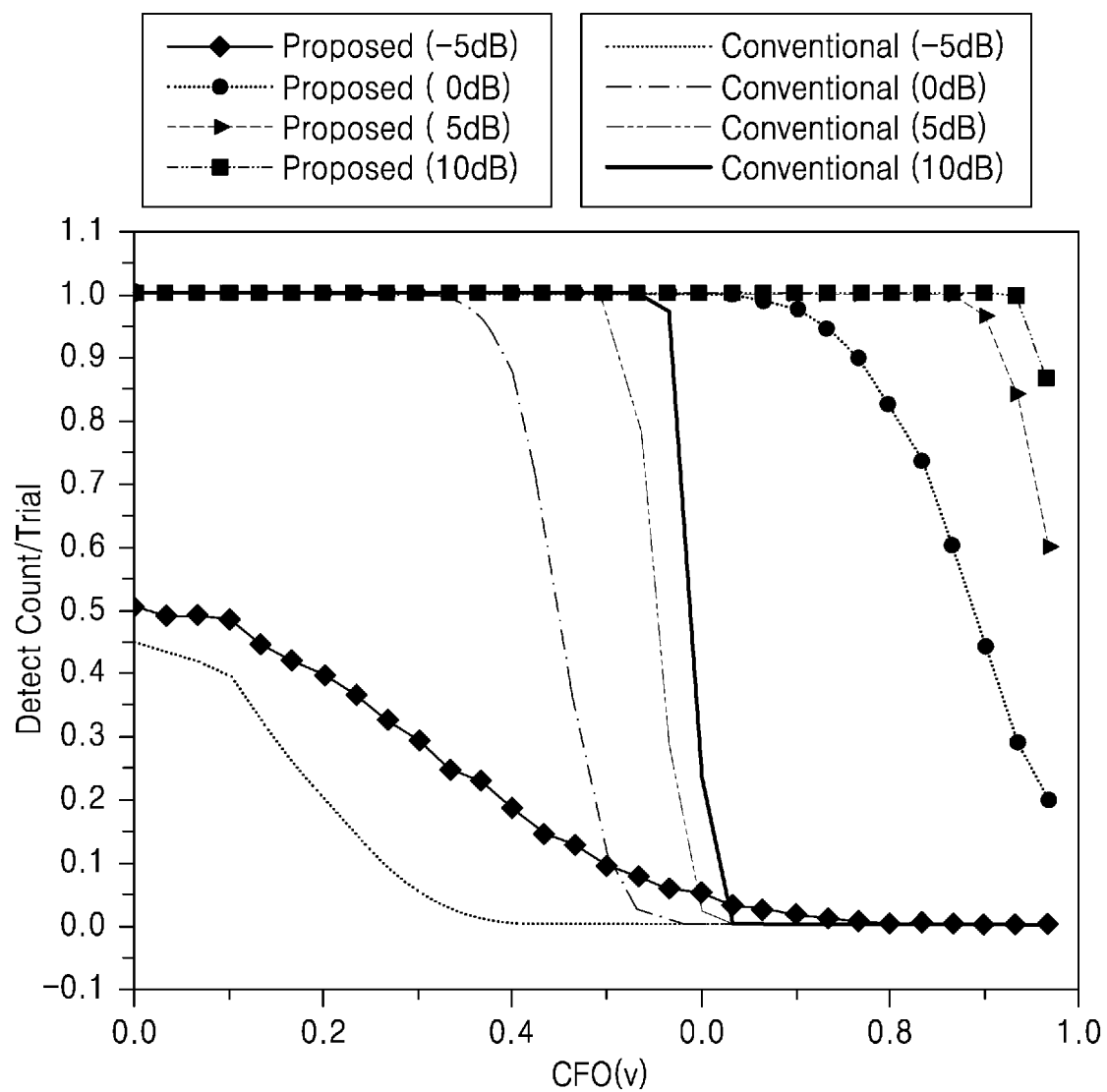
FIG. 4 is a graph showing improved detection accuracy when a synchronization signal detection method according to an embodiment is used.

FIG. 4 is a graph showing improved detection accuracy when a synchronization signal detection method according to an embodiment is used.

FIG. 4 shows, when an SNR varies from −5 dB to 10 dB, a graph comparing a case (Conventional) of detecting a synchronization signal using only a correlation absolute value of a PSS vector according to the conventional method and a case (Proposed) of detecting a synchronization signal according to a method according to the embodiment.

In the case (Proposed) of detecting a synchronization signal according to the method according to the embodiment, it can be seen that the decrease in a PSS detection success rate (Detect Count/Trial) due to the increase of a carrier frequency offset (CFO) is significantly reduced compared to the case (Conventional) of detecting a synchronization signal using only the correlation absolute value of the PSS vector according to the conventional method.

A method and an apparatus according to an embodiment enable faster and more extensive PSS detection in a band by detecting a PSS based on a PSS correlation value, a frequency offset, and a timing offset.

What is claimed is:

1. A synchronization signal detection method performed by a receiver including a processor and a memory, the synchronization signal detection method comprising:
calculating a PSS correlation value for a primary synchronization signal (PSS) included in a received signal;
detecting a frequency offset for the PSS and a timing offset for sampling timing of the received signal; and
detecting the PSS based on the PSS correlation value, the frequency offset, and the timing offset,
wherein the calculating of the PSS correlation value comprises calculating the PSS correlation value according to a correlation between a PSS vector stored in the memory and the received signal, and
wherein the PSS vector is a vector in a time domain.

2. The synchronization signal detection method of claim 1, wherein the PSS vector is a PSS vector in a time domain that reflects a conjugate transpose matrix of a discrete fourier transform (DFT) matrix to a PSS vector in a frequency domain.

3. The synchronization signal detection method of claim 2, further comprising:
shifting a frequency band of the received signal by the frequency offset before calculating the frequency offset and the timing offset.

4. The synchronization signal detection method of claim 3, wherein the frequency offset has a value corresponding to a difference between a center frequency of the received signal and a frequency at which the PSS is located.

5. The synchronization signal detection method of claim 4, wherein the calculating of the frequency offset and the timing offset comprises:
calculating the frequency offset using a frequency offset detection vector including a fine shift matrix indicating a frequency shift in a time domain and the PSS vector.

6. The synchronization signal detection method of claim 5, further comprising:
performing decimation on an adjacent band including the frequency at which the PSS is located in the received signal before the calculating of the frequency offset and the timing offset.

7. The synchronization signal detection method of claim 6, further comprising:
resampling the decimated received signal.

8. The synchronization signal detection method of claim 7, wherein the timing offset corresponds to a timing error occurring in the resampling process.

9. The synchronization signal detection method of claim 8, wherein the calculating of the frequency offset and the timing offset comprises:
calculating the timing offset using a timing offset detection vector including a fine shift matrix indicating timing delay in a time domain and the PSS vector.

10. The synchronization signal detection method of claim 9, further comprising:
feeding back the detected frequency offset.

11. The synchronization signal detection method of claim 10, further comprising:
feeding back the detected timing offset.

12. The synchronization signal detection method of claim 1, comprising:
detecting the PSS from the received signal received in a time division duplex (TDD) communication system.

13. A receiver including a processor and a memory, the receiver comprising:
a PSS correlator configured to calculate a PSS correlation value for a primary synchronization signal (PSS) included in a received signal;
a frequency offset detector configured to detect a frequency offset for the PSS;
a timing offset detector configured to detect a timing offset for sampling timing of the received signal; and
a sync detector configured to detect the PSS based on the PSS correlation value, the frequency offset, and the timing offset,
wherein the PSS correlator calculates the PSS correlation value according to a correlation between a PSS vector stored in the memory and the received signal, and
wherein the PSS vector is a vector in a time domain.

14. A repeater including a receiver receiving and processing a communication signal, wherein the receiver comprises:
- a PSS correlator configured to calculate a PSS correlation value for a primary synchronization signal (PSS) included in a received signal;
- a frequency offset detector configured to detect a frequency offset for the PSS;
- a timing offset detector configured to detect a timing offset for sampling timing of the received signal; and
- a sync detector configured to detect the PSS based on the PSS correlation value, the frequency offset, and the timing offset,
- wherein the PSS correlator calculates the PSS correlation value according to a correlation between a PSS vector stored in the memory and the received signal, and
- wherein the PSS vector is a vector in a time domain.

* * * * *